United States Patent
Ukai et al.

(10) Patent No.: US 11,875,800 B2
(45) Date of Patent: Jan. 16, 2024

(54) TALKER PREDICTION METHOD, TALKER PREDICTION DEVICE, AND COMMUNICATION SYSTEM

(71) Applicant: Yamaha Corporation, Hamamatsu (JP)

(72) Inventors: Satoshi Ukai, Hamamatsu (JP); Ryo Tanaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 126 days.

(21) Appl. No.: 17/449,983

(22) Filed: Oct. 5, 2021

(65) Prior Publication Data

US 2022/0115021 A1 Apr. 14, 2022

(30) Foreign Application Priority Data

Oct. 9, 2020 (JP) ................. 2020-171050

(51) Int. Cl.
*G10L 17/06* (2013.01)
*G06V 40/10* (2022.01)
(Continued)

(52) U.S. Cl.
CPC ............... *G10L 17/06* (2013.01); *G06N 5/04* (2013.01); *G06V 40/10* (2022.01); *G10L 17/02* (2013.01);
(Continued)

(58) Field of Classification Search
CPC ........ G06F 21/32; G06F 40/35; G06F 3/0414; G06F 16/23; G06F 16/951; G06N 3/08; G06N 5/04; G06N 3/0442; G06T 7/20; G06V 40/10; G06V 40/161; G06V 40/172; G06V 40/174; G06V 40/28; G10L 17/02; G10L 17/06; G10L 17/10; G10L 19/04; G10L 25/06; G10L 17/00; G10L 17/26; G10L 25/48; G10L 15/005; G10L 15/26; G11B 27/28; G11B 27/031; H04B 7/0617; H04L 65/403; H04L 65/80; H04L 51/02; H04M 3/568; H04M 3/385; H04N 7/147; H04N 23/60; H04R 1/326; H04R 3/00; H04R 29/004; A61B 5/165; B60W 50/0098; G06Q 30/02; G06Q 40/06;
(Continued)

(56) References Cited

U.S. PATENT DOCUMENTS 5,220,568 A * 6/1993 Howe ............... H03M 13/2703
341/94
7,702,563 B2 * 4/2010 Balson .................. G06Q 40/06
705/37

(Continued)

FOREIGN PATENT DOCUMENTS

JP 2012-29209 A 2/2012

OTHER PUBLICATIONS

Extended European Search Report issued in European Application No. 21201060.7 dated Mar. 4, 2022 (7 pages).

(Continued)

*Primary Examiner* — Gerald Gauthier
(74) *Attorney, Agent, or Firm* — Crowell & Moring LLP

(57) ABSTRACT

A talker prediction method obtains a voice from a plurality of talkers, records a conversation history of the plurality of talkers, identifies a talker of the obtained voice, and predicts a next talker among the plurality of talkers based on the identified talker and the conversation history.

17 Claims, 10 Drawing Sheets

(51) Int. Cl.
*G06N 5/04* (2023.01)
*G10L 17/02* (2013.01)
*H04L 65/403* (2022.01)
*H04R 1/32* (2006.01)
*H04R 3/00* (2006.01)
*H04N 23/60* (2023.01)
*H04B 7/06* (2006.01)

(52) U.S. Cl.
CPC ........... *H04L 65/403* (2013.01); *H04N 23/60* (2023.01); *H04R 1/326* (2013.01); *H04R 3/00* (2013.01); *H04B 7/0617* (2013.01)

(58) Field of Classification Search
CPC .. G08G 1/0962; H03M 13/2703; H04S 7/303; H04W 4/02
See application file for complete search history.

(56) References Cited

U.S. PATENT DOCUMENTS

| | | | | |
|---|---|---|---|---|
| 7,822,605 | B2* | 10/2010 | Zigel | G10L 17/06 704/246 |
| 8,014,496 | B2* | 9/2011 | Schultz | H04M 3/385 379/88.19 |
| 8,185,380 | B2* | 5/2012 | Kameyama | G08G 1/0962 434/362 |
| 8,583,434 | B2* | 11/2013 | Gallino | G10L 15/26 704/211 |
| 9,197,974 | B1* | 11/2015 | Clark | H04R 29/004 |
| 10,657,962 | B2* | 5/2020 | Zhang | G06F 40/35 |
| 10,976,744 | B2* | 4/2021 | Huai | B60W 50/0098 |
| 11,418,557 | B1* | 8/2022 | Henry | H04L 65/80 |
| 2003/0014399 | A1* | 1/2003 | Hansen | G06F 16/951 |
| 2006/0111904 | A1* | 5/2006 | Wasserblat | G10L 17/00 704/E17.001 |
| 2008/0071538 | A1* | 3/2008 | Bossemeyer, Jr. | G10L 17/06 704/E17.007 |
| 2012/0010886 | A1* | 1/2012 | Razavilar | G10L 15/005 704/E17.001 |
| 2013/0110949 | A1* | 5/2013 | Maurel | G06Q 30/02 709/206 |
| 2013/0197912 | A1* | 8/2013 | Hayakawa | G10L 25/48 704/246 |
| 2015/0067822 | A1* | 3/2015 | Randall | G06F 21/32 726/17 |
| 2015/0081299 | A1* | 3/2015 | Jasinschi | A61B 5/165 704/246 |
| 2015/0170638 | A1* | 6/2015 | Bezar | G10L 15/02 704/246 |
| 2015/0223203 | A1* | 8/2015 | Lindner | H04W 4/02 455/552.1 |
| 2015/0319309 | A1* | 11/2015 | Cunico | H04M 3/568 379/202.01 |
| 2018/0226069 | A1* | 8/2018 | Fleischman | G06F 40/35 |
| 2019/0007780 | A1* | 1/2019 | Sheaffer | G06T 7/20 |
| 2019/0087435 | A1* | 3/2019 | Katardjiev | G06F 16/23 |
| 2020/0267427 | A1* | 8/2020 | Rogers | G11B 27/28 |
| 2020/0409548 | A1* | 12/2020 | Irvine | G06F 3/0414 |
| 2021/0097110 | A1* | 4/2021 | Asthana | H04L 51/02 |
| 2021/0097502 | A1* | 4/2021 | Hilleli | G06N 3/08 |
| 2022/0115021 | A1* | 4/2022 | Ukai | H04R 1/326 |
| 2022/0116729 | A1* | 4/2022 | Ukai | G10L 25/06 |
| 2022/0335949 | A1* | 10/2022 | Liu | G06V 40/172 |
| 2022/0382993 | A1* | 12/2022 | Lewis | G06N 3/0442 |

OTHER PUBLICATIONS

European Office Action issued in European Application No. 21 201 060.7 dated Oct. 10, 2023 (4 pages).

* cited by examiner

TALKER PREDICTION METHOD, TALKER PREDICTION DEVICE, AND COMMUNICATION SYSTEM

CROSS REFERENCE TO RELATED APPLICATIONS

This application claims the benefit of priority to Japanese Patent Application No. 2020-171050 filed on Oct. 9, 2020. The entire content of the application is hereby incorporated herein by reference.

BACKGROUND

Technical Field

An embodiment of the present disclosure relates to a talker prediction method, a talker prediction device, and a communication system that predict a talker.

Background Information

Japanese Unexamined Patent Application Publication No. 2012-029209 discloses a talker prediction device that predicts a next talker among a plurality of people.

It is desired to predict the next talker with higher accuracy while the current talker is talking.

SUMMARY

In view of the foregoing, an object of an embodiment of the present disclosure is to provide a talker prediction method, a talker prediction device, and a communication system that are capable of predicting a next talker with high accuracy while the current talker is talking.

A talker prediction method obtains a voice from a plurality of talkers, and records a conversation history of the plurality of talkers. The talker prediction method identifies a talker of the obtained voice, and predicts a next talker among the plurality of talkers, based on the identified talker and the conversation history.

According to an embodiment of the present disclosure, while the current talker is talking, a next talker is able to be predicted with high accuracy.

DETAILED DESCRIPTION

Figure 1:
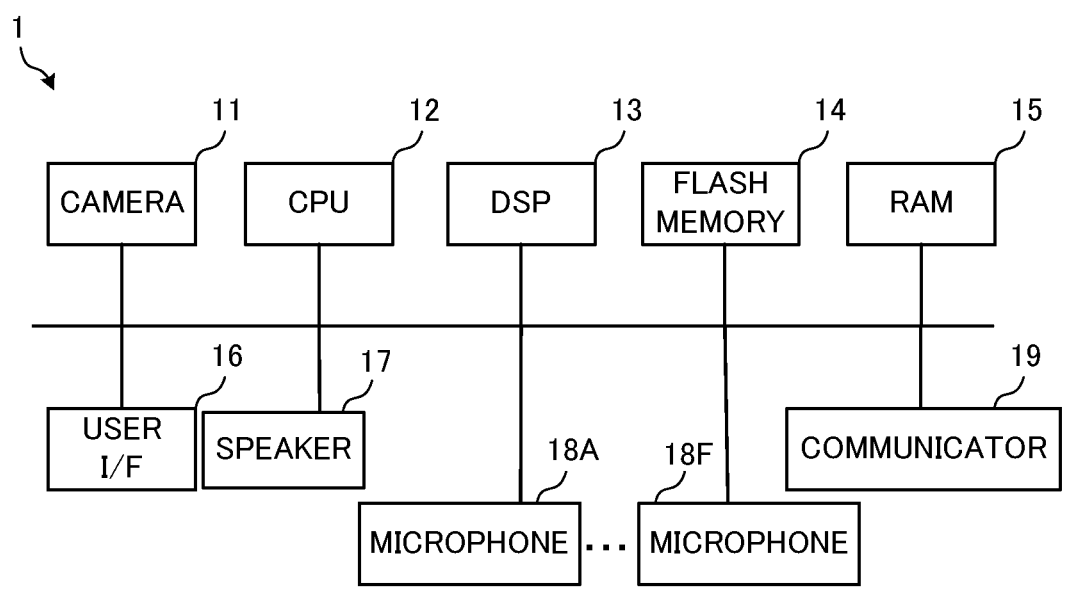
FIG. 1 is a block diagram showing a configuration of an audio signal processing apparatus 1.

FIG. 1 is a block diagram showing a configuration of an audio signal processing apparatus 1. The audio signal processing apparatus 1 includes a camera 11, a CPU 12, a DSP 13, a flash memory 14, a RAM 15, a user interface (I/F) 16, a speaker 17, six microphones 18A to 18F, and a communicator 19. It is to be noted that, in the present embodiment, a signal means a digital signal.

The camera 11, the speaker 17, and the microphones 18A to 18F are disposed above or below a display (not shown), for example. The camera 11 obtains an image of a user present in front of the display (not shown). The microphones 18A to 18F obtain a voice of the user present in front of the display (not shown). The speaker 17 outputs a sound to the user present in front of the display (not shown). It is to be noted that the number of microphones is not limited to six. The number of microphones may be one. The number of microphones of the present embodiment is six, which configures an array microphone. The DSP 13 performs beamforming processing on an audio signal obtained by the microphones 18A to 18F.

The CPU 12 reads an operating program from the flash memory 14 to the RAM 15 and functions as a controller that collectively controls the operations of the audio signal processing apparatus 1. It is to be noted that the program does not need to be stored in the flash memory 14 of the own device. The CPU 12 may download the program each time from a server or the like, for example, and may read out the program to the RAM 15.

The DSP 13 is a signal processor that processes each of a video signal and an audio signal according to the control of the CPU 12. The DSP 13 functions as an image processor that performs framing processing in which an image of a talker is extracted from a video signal, for example. In addition, the DSP 13 also functions as an audio signal processor that performs beamforming, for example.

The communicator 19 sends a video signal and an audio signal on a near-end side that have been processed by the DSP 13, to a different apparatus. The different apparatus is an audio signal processing apparatus on a far-end side to be connected through the Internet or the like. In addition, the communicator 19 receives a video signal and an audio signal from the different apparatus. The communicator 19 outputs the received video signal to a display (not shown). The communicator 19 outputs the received audio signal to the speaker 17. The display displays an image obtained by a camera of the different apparatus. The speaker 17 outputs the voice of a talker obtained by the microphone of the different apparatus. As a result, the audio signal processing apparatus 1 functions as a communication system to perform a voice conversation with a person at a remote location.

Figure 2:
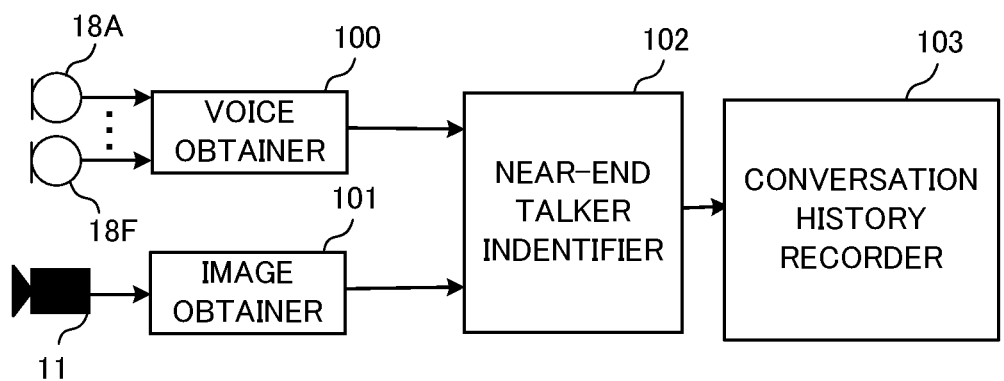
FIG. 2 is a functional block diagram of the audio signal processing apparatus 1.
Figure 3:
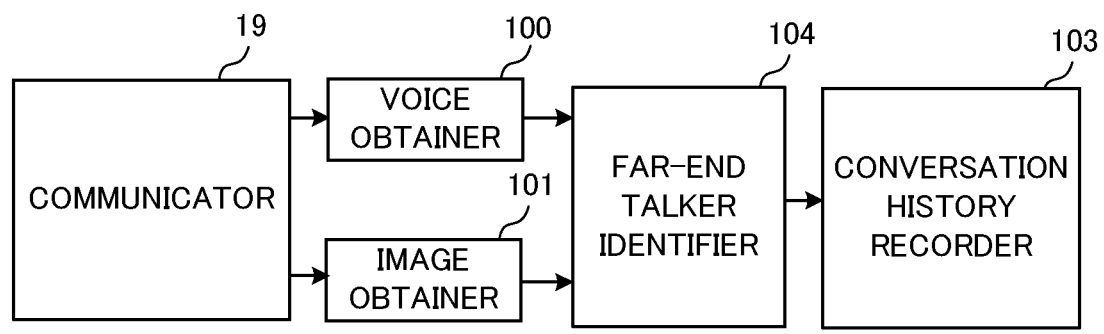
FIG. 3 is a functional block diagram of the audio signal processing apparatus 1.
Figure 4:
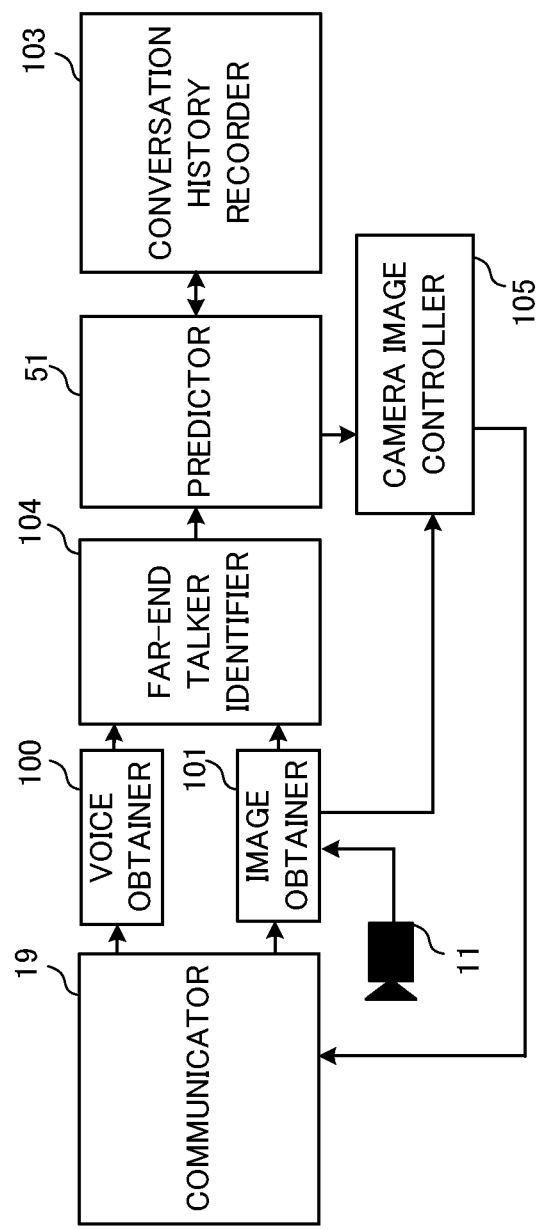
FIG. 4 is a functional block diagram of the audio signal processing apparatus 1.
Figure 5:
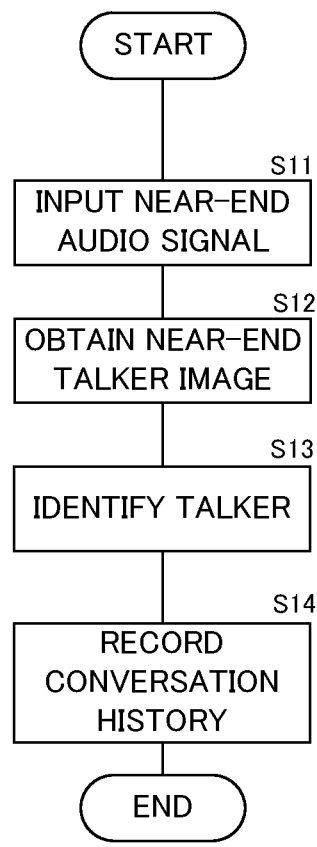
FIG. 5 is a flow chart showing an operation of an audio signal processing method.
Figure 6:
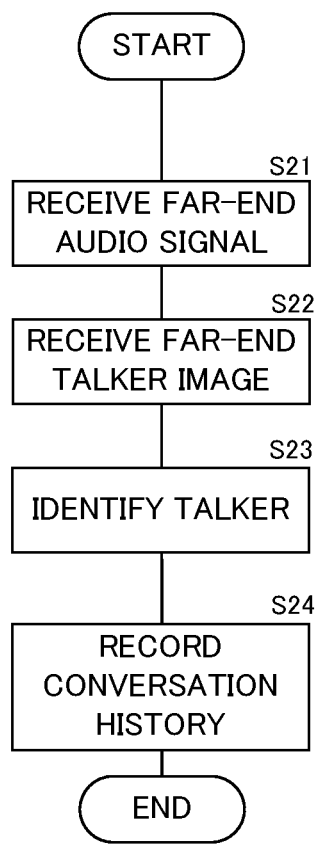
FIG. 6 is a flow chart showing an operation of the audio signal processing method.
Figure 7:
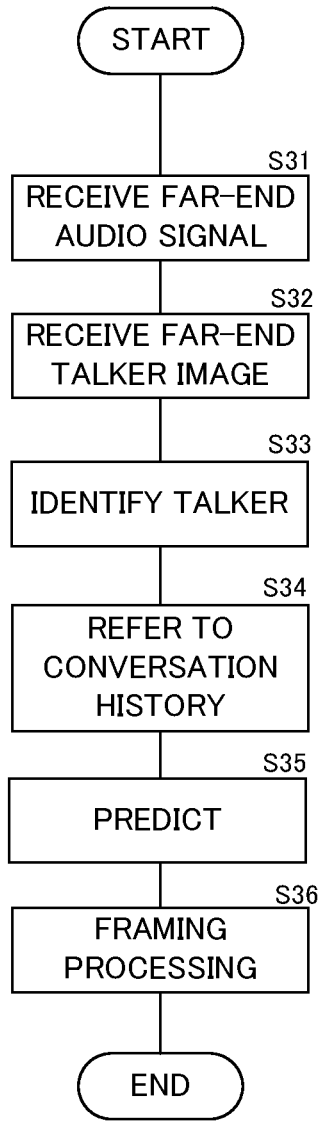
FIG. 7 is a flow chart showing an operation of the audio signal processing method.

FIG. 2, FIG. 3, and FIG. 4 are functional block diagrams of the audio signal processing apparatus 1. FIG. 5, FIG. 6, and FIG. 7 are flow charts showing an operation of the audio signal processing method. The functional configuration shown in FIG. 2, FIG. 3, and FIG. 4 is implemented by the CPU 12 and the DSP 13.

The audio signal processing apparatus 1 functionally includes a voice obtainer 100, an image obtainer 101, a near-end talker identifier 102, a conversation history recorder 103, a far-end talker identifier 104, a camera image controller 105, and a predictor 51.

The near-end talker identifier 102 and the far-end talker identifier 104 correspond to a talker identifier of the present disclosure. FIG. 2 shows a configuration in a case in which talker identification is performed based on a video signal and an audio signal on a near-end side and recorded as conversation history, and FIG. 5 shows the operation in such case.

The voice obtainer 100 receives an input of an audio signal from the microphones 18A to 18F as a near-end audio signal (S11). In addition, the image obtainer 101 obtains a video signal from the camera 11 as a near-end talker image (S12). The near-end talker identifier 102 identifies a talker on a near-end side, based on the near-end audio signal and the near-end talker image (S13). The conversation history recorder 103 records an identifier that indicates the talker identified by the near-end talker identifier 102 and the order of talkers, as conversation history (S14).

The near-end talker identifier 102 identifies a talker, based on a voice feature amount, for example. The voice feature amount is unique information different for each talker. The voice feature amount includes an average volume level (power), a highest pitch frequency, a lowest pitch frequency, or a speech speed, for example. The near-end talker identifier 102 extracts the voice feature amount from an audio signal and identifies a talker, by a predetermined algorithm using a neural network or the like, for example. In addition, the near-end talker identifier 102 may identify a talker, based on an arrival direction of a voice. For example, the near-end talker identifier 102 is able to determine a timing at which the voice of a talker has reached a microphone by determining a cross correlation of audio signals obtained by a plurality of microphones. The near-end talker identifier 102 is able to determine the arrival direction of the voice of a talker, based on the positional relationship of each microphone and the arrival timing of the voice.

In addition, the near-end talker identifier 102 may identify a talker by performing face recognition of the talker. The face recognition of a talker is processing of recognizing a face position of a talker from a near-end talker image, by using a predetermined algorithm using the neural network or the like, for example.

Figure 8:
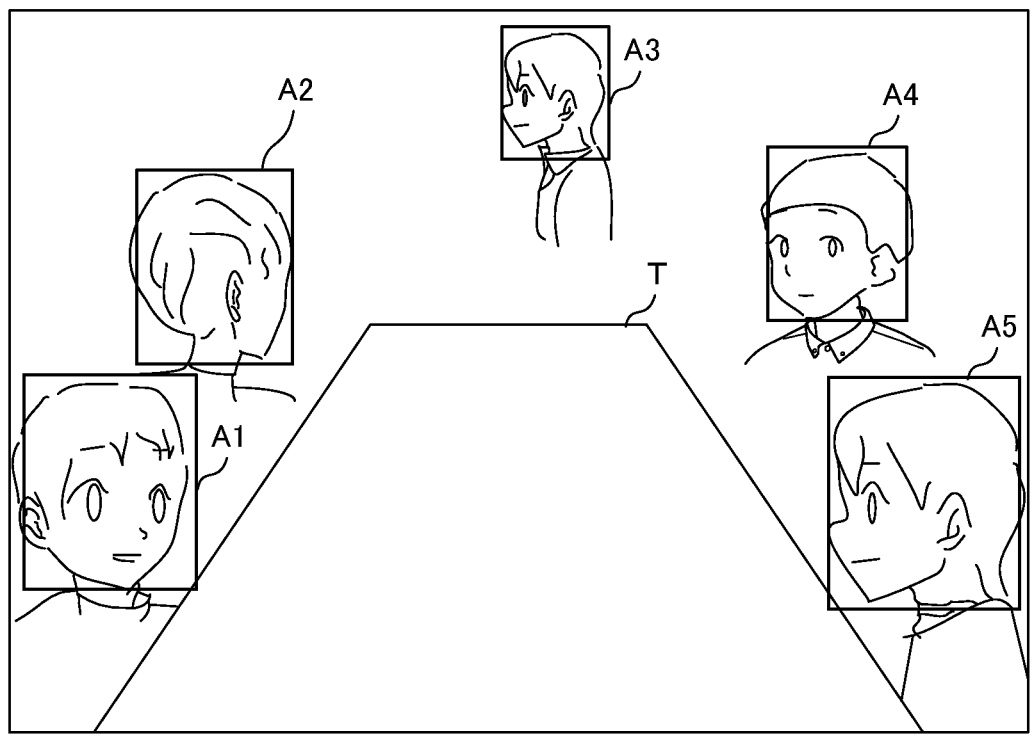
FIG. 8 is a view showing an example of an image captured by a camera 11.

FIG. 8 is a view showing an example of an image captured by the camera 11. In the example of FIG. 8, the camera 11 captures a face image of each of a plurality of users in the longer direction (the depth direction) of a table T.

The table T has a rectangular shape in a plan view. The camera 11 captures four users on the left side and the right side of the table T in the shorter direction, and a user at a position far from the table T.

The near-end talker identifier 102 recognizes the face of a talker from such image captured by the camera 11. In the example of FIG. 8, a user A1 in the lower left of the image is talking. The near-end talker identifier 102 recognizes a face image with a change in the image of a mouth, for example, as the face of a talker, based on images of a plurality of frames. It is to be noted that, in the example of FIG. 8, other users A2 to A5, although the faces have been recognized, are not talkers. Therefore, the near-end talker identifier 102 recognizes the face of the user A1 as the face of a talker.

In addition, the near-end talker identifier 102 may set a boundary box (Bounding Box) as shown by the square in FIG. 8, at a position of the face of the recognized talker. The near-end talker identifier 102 is also able to obtain a distance from a talker, based on the size of the boundary box. The flash memory 14 previously stores a table, a function, or the like that shows the relationship between the size of the boundary box and the distance. The near-end talker identifier 102 is also able to obtain a distance from a talker by comparing the size of a set boundary box and the table stored in the flash memory 14.

The near-end talker identifier 102 obtain two-dimensional coordinates (X, Y coordinates) of the set boundary box and the distance from a talker, as the position information of the talker. The conversation history recorder 103 also records the position information of a talker.

FIG. 3 shows a configuration in a case in which talker identification is performed based on a video signal and an audio signal on a far-end side and recorded as conversation history, and FIG. 6 shows the operation in such a case. The voice obtainer 100 receives a far-end audio signal through the communicator 19 (S21). In addition, the image obtainer 101 receives a far-end talker image through the communicator (S22). The far-end talker identifier 104 identifies a talker on a far-end side, based on the far-end audio signal and the far-end talker image (S23). The conversation history recorder 103 records an identifier that indicates the talker identified by the far-end talker identifier 104 and the order of talkers, as conversation history (S24).

The method of identifying a talker of the far-end talker identifier 104 is the same as the method of identifying a talker of the near-end talker identifier 102. The far-end talker identifier 104 identifies a talker, based on a voice feature amount, for example. Alternatively, the far-end talker identifier 104 may identify a talker by performing face recognition of the talker from a received far-end talker image.

It is to be noted that, in a case in which an apparatus on the far-end side is an apparatus capable of identifying a talker in the same manner as the own apparatus, the far-end talker identifier 104 may receive information for identifying a talker from the apparatus on a far-end side. In such a case, the far-end talker identifier 104 is able to identify a talker on a far-end side, based on received information.

In addition, the near-end talker identifier 102 and the far-end talker identifier 104 do not necessarily need to identify a single talker (utterance of the same talker) for a plurality of utterances by a certain talker. For example, the near-end talker identifier 102 and the far-end talker identifier 104 may identify talkers even having a similar voice feature amount, as different talkers. The near-end talker identifier 102 and the far-end talker identifier 104 may identify talkers having even slightly different voice feature amount or the like, as different talkers. Even when the near-end talker identifier 102 and the far-end talker identifier 104 identify the same talker as a different talker and record the conversation history, the predictor 51 is still able to predict the next talker. In other words, the near-end talker identifier 102 and the far-end talker identifier 104 may identify a talker based on an excessively segmented element to the extent that the next talker is able to be predicted or that one talker is able to be identified as a different talker. In addition, the near-end talker identifier 102 and the far-end talker identifier 104 may record the voice feature amount itself of a talker, the arrival direction itself of the voice of a talker, the face image itself of a talker, or the position information itself of a talker in the conversation history, as a result of the talker identification.

It is to be noted that, although the present embodiment shows an example in which the number of devices on a far-end side is one and the one device communicates one to one, the audio signal processing apparatus 1 may also perform communication with devices on a far-end side at multiple points and function as a multipoint communication system. In a case of performing communication with the devices on a far-end side at multiple points, the far-end talker identifier 104 performs processing of identifying a talker for each device on a far-end side and identifies all far-end talkers.

Figure 9:
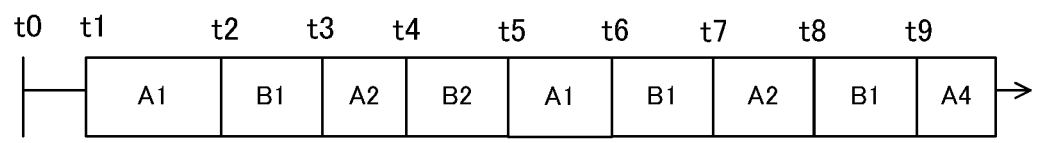
FIG. 9 is a view showing an example of conversation history.

FIG. 9 shows an example of conversation history. The conversation history recorder 103 records conversation history in time series. For example, in the example of FIG. 9, a talker A1 on a near-end side talks from time t1 to time t2, and a talker B1 on a far-end side talks from the time t2 to time t3. A talker A2 on the near-end side talks from the time t3 to time t4, and a talker B2 on the far-end side talks from the time t4 to time t5. The talker A1 on the near-end side talks from the time t5 to time t6, and the talker B1 on the far-end side talks from the time t6 to time t7. The talker A2 on the near-end side talks from the time t7 to time t8, and the talker B1 on the far-end side talks from the time t8 to time t9. Subsequently, a talker A4 on the near-end side talks from the time t9. It is to be noted that it is not necessary to record time information. The conversation history recorder 103 may only record an identifier that indicates who the talker is and an order (number) of the talker.

The audio signal processing apparatus 1 predicts a next talker based on the conversation history. The audio signal processing apparatus 1 functions as a talker prediction device. FIG. 4 shows a functional configuration of the audio signal processing apparatus 1 in a case of predicting, and FIG. 7 shows the operation in such a case. The example of FIG. 7 shows the operation (the operation of a talker prediction method) of prediction when a talker on a far-end side is currently talking.

The voice obtainer 100 receives a far-end audio signal through the communicator 19 (S31). In addition, the image obtainer 101 receives a far-end talker image through the communicator 19 (S32). The far-end talker identifier 104 identifies a talker on a far-end side based on the far-end audio signal and the far-end talker image (S33). It is to be noted that, in a case in which an apparatus on the far-end side is an apparatus capable of identifying a talker in the same manner as the own apparatus, the far-end talker identifier 104 may receive information for identifying a talker from the apparatus on the far-end side. In such case, the far-end talker identifier 104 is able to identify a talker on the far-end side, based on received information.

Subsequently, the predictor 51 refers to the conversation history that the conversation history recorder 103 has recorded (S34) and predicts a next talker (S35). Specifically, the predictor 51, from the conversation history, detects a part that the far-end talker has talked, where the far-end talker is identified by the far-end talker identifier 104, and predicts the next talker according to talk probability of the talker who is talking immediately after a detected part. For example, in a case in which the far-end talker identifier 104 identifies the talker B1 on the far-end side, the predictor 51 detects the times t2 to t3, t6 to t7, and t8 to t9 in the conversation history shown in FIG. 9. The predictor 51 obtains the talk probability of each talker based on the history of a talker who talks immediately after such times. In the example of FIG. 9, after the talker B1 talks, the talker A2 talks twice and the talker A4 has talked once. Therefore, the talk probability of the talker A2 is 66.7%, and the talk probability of the talker A4 is 33.3%. The predictor 51 predicts that the next talker will be the talker A2 according to the talk probability.

In addition, the predictor 51, in a case in which the near-end talker identifier 102 or the far-end talker identifier 104 record the voice feature amount itself of a talker, the arrival direction itself of the voice of a talker, the face image itself of a talker, the position information itself of a talker, or the like, in the conversation history as talker identification results, searches a talker identification result similar to the current talker identification result, from the conversation history recorder 103. Then, the predictor 51 may predict the next talker from the talker identification result that the conversation history recorder 103 has recorded, based on a plurality of talker identification results recorded immediately after the time when searched current talker identification results are recorded. In such a case, the predictor 51 may also use the average of the plurality of talker identification results recorded immediately after the time when the searched current talker identification results are recorded, for example, as a result of talker prediction. Alternatively, the predictor 51 may also use a talker identification result that has the smallest sum of differential amount with other talker prediction results as a representative value and as a result of talker prediction.

It is to be noted that the predictor 51 may further predict the next talker based on the image received by the communicator 19 or the image captured by the camera 11. For example, a person who is raising the hand may be predicted as the next talker. Alternatively, a person whose eyes are wide open may be predicted as the next talker. In addition, the predictor 51 may predict the next talker based on the audio signal received by the communicator 19 or the audio signal obtained by the microphones 18A to 18F. For example, the predictor 51, when recognizing a particular utterance such as "er" or "uh," predicts that a corresponding talker will be the next talker. However, the predictor 51 gives priority to the prediction based on the conversation history. The predictor 51, in a case in which a plurality of talkers with the same talk probability or similar talk probability (within 10%, for example) are present, preferably further predicts the next talker based on the received image.

Subsequently, the camera image controller 105 controls the image that the camera 11 has captured, according to the prediction result of the predictor 51 (S36). The control of an image includes framing processing, for example. The camera image controller 105 performs the framing processing in which the face image of the talker A4 is extracted from the image captured by the camera 11 and obtained by the image obtainer 101. The position of each talker is recorded by the conversation history recorder 103. The camera image controller 105 extracts an image at a position corresponding to a predicted talker. The camera image controller 105 outputs the image on which the framing processing has been performed, to the communicator 19. The communicator 19 sends the image on which the framing processing has been performed, to the far-end side.

As a result, the face image of the talker A2 is displayed on a display (not shown) on the far-end side. Therefore, the talker B1 on the far-end side is able to talk while looking at the most likely next talker.

It is to be noted that, while the above shows that the camera image controller 105 performs the framing processing in which the image of the predicted talker is extracted from the image captured by the camera 11, the camera image controller 105 may perform processing of blurring positions other than the position of the predicted talker, for example. In addition, the camera image controller 105 may control the shooting direction and zoom of the camera 11 to magnify and capture the face of the predicted talker.

Moreover, in a case in which the near-end talker identifier 102 identifies a talker on the near-end side, the camera image controller 105 performs the framing processing of extracting the image of the identified talker on the near-end side. Therefore, the image of the currently talking talker is sent to the apparatus on the far-end side.

However, the predictor 51 may predict the next talker even when the near-end talker identifier 102 identifies a talker on the near-end side. The camera image controller 105 may extract the image of the predicted next talker and send the image to the apparatus on the far-end side through the communicator 19. In a case in which the next talker predicted by the predictor 51 is a talker on the near-end side, the camera image controller 105 performs the framing processing of extracting the face image of the talker on the near-end side from the image captured by the camera 11. The camera image controller 105 sends the extracted image of the talker on the near-end side to the apparatus on the far-end side.

In a case in which the next talker predicted by the predictor 51 is a talker on the far-end side, the camera image controller 105 performs the framing processing of extracting the face image of the talker on the far-end side from the image received through the communicator 19. The camera image controller 105 displays the extracted image of the talker on the far-end side, on the display (not shown).

However, the camera image controller 105, in the case of sending the extracted image of the talker on the near-end side to the apparatus on the far-end side, sends the image to the apparatus on the far-end side, where the image is preferably one of the image of a current talker on the near-end side and the image of a predicted next talker on the near-end side periodically switched. For example, the camera image controller 105 sends the image of the predicted next talker on the near-end side about once every 10 seconds. Alternatively, the camera image controller 105 may combine a small image of the predicted next talker with the image of the current talker, and may send the combined image to the far-end side.

Figure 10:
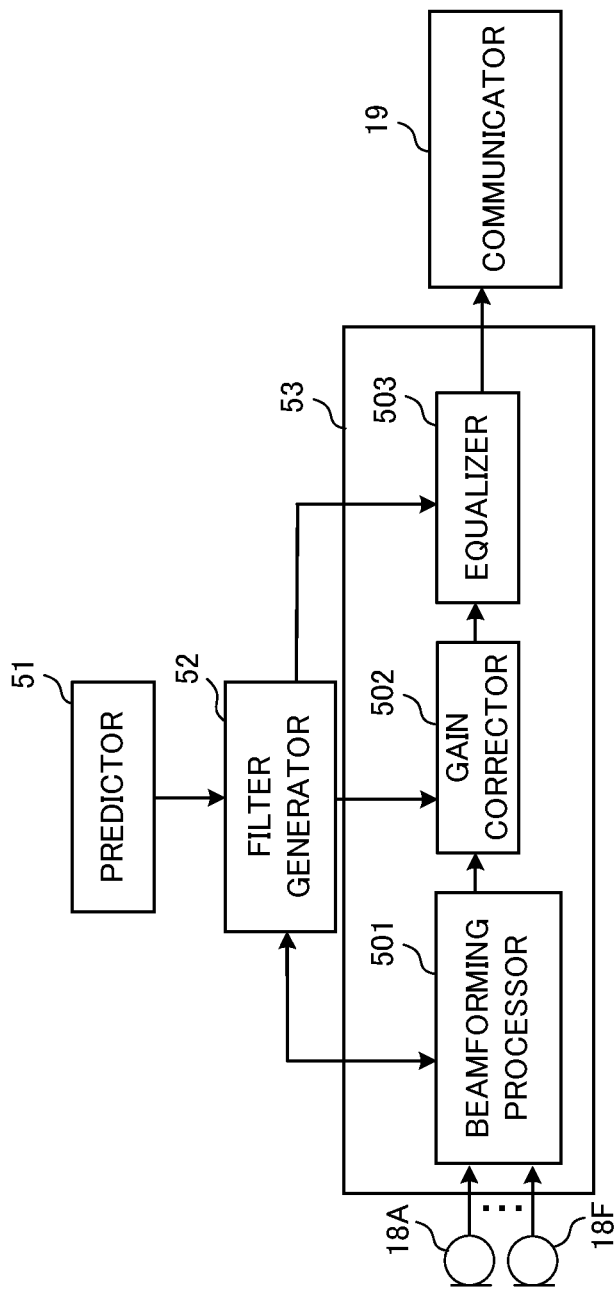
FIG. 10 is a block diagram showing a functional configuration of the audio signal processing apparatus 1 in a case of performing audio signal processing.

It is to be noted that the audio signal processing apparatus 1 may perform audio signal processing on the audio signal obtained by the microphone based on a prediction result of the predictor 51. FIG. 10 is a block diagram showing a functional configuration of the audio signal processing apparatus 1 in a case of performing audio signal processing based on the prediction result. The audio signal processing apparatus 1 functionally includes a filter generator 52 and an audio signal processor 53. In addition, the audio signal processor 53 functionally includes a beamforming processor 501, a gain corrector 502, and an equalizer 503. Such functional configurations are implemented by the CPU 12 and the DSP 13.

The filter generator 52 generates a correction filter based on the prediction result of the predictor 51. The correction filter includes the filter processing at least in the beamforming processor 501.

The beamforming processor 501 performs beamforming by performing the filter processing on each of the audio signals obtained by the microphones 18A to 18F and combining the audio signals. The signal processing according to the beamforming can be any processing such as the Delay Sum type, the Griffiths Jim type, the Sidelobe Canceller type, or the Frost Adaptive Beamformer.

The filter generator 52 generates a filter coefficient to form directivity toward the position of a predicted next talker and sets the filter coefficient to the beamforming processor 501. As a result, the audio signal processing apparatus 1 is able to obtain the voice of the predicted next talker with a high SN ratio from the beginning of the talk.

In addition, the filter generator 52 sets the gain of the gain corrector 502, based on the prediction result of the predictor 51. The voice of a talker is attenuated as a distance from a microphone is increased. Therefore, the filter generator 52 generates a gain correction filter to cause the level of an audio signal to be increased as a distance from a predicted next talker is increased, and sets the gain correction filter to the gain corrector 502. As a result, the audio signal processing apparatus 1 is able to obtain the voice of the predicted next talker at a stable level regardless of the distance from the talker.

In addition, the filter generator 52 may set the frequency characteristics of the equalizer 503 to cause the level of the high band to be increased as the distance from the predicted next talker is increased. The voice of a talker tends to be attenuated more greatly in the high band than in the low band, as the distance from a microphone is increased. Therefore, the audio signal processing apparatus 1 is able to obtain the voice of the predicted next talker with stable voice quality regardless of the distance from the talker.

The foregoing embodiments are illustrative in all points and should not be construed to limit the present disclosure. The scope of the present disclosure is defined not by the foregoing embodiments but by the following claims for patent. Further, the scope of the present disclosure is intended to include all modifications within the scopes of the claims and within the meanings and scopes of equivalents.

What is claimed is:

1. A talker prediction method comprising:
obtaining a voice from a plurality of talkers;
recording a conversation history of the plurality of talkers;
identifying a talker of the obtained voice;
detecting a part that the identified talker has talked from the conversation history; and
predicting a next talker among the plurality of talkers based on the identified talker and the conversation history,
wherein the next talker is predicted according to talk probability of a talker talking immediately after the detected part.

2. The talker prediction method according to claim 1, further comprising controlling an image captured by a camera based on a result of the prediction.

3. The talker prediction method according to claim 1, further comprising performing audio signal processing on an audio signal obtained by a microphone based on a result of the prediction.

4. The talker prediction method according to claim 2, wherein the controlling the image includes framing processing.

5. The talker prediction method according to claim 3, wherein the audio signal processing includes beamforming processing.

6. The talker prediction method according to claim 1, wherein the talker of the obtained voice is identified based on a voice feature amount of the obtained voice.

7. The talker prediction method according to claim 1, further comprising estimating an arrival direction of a voice, wherein the talker of the obtained voice is identified based on the arrival direction of the voice.

8. The talker prediction method according to claim 1, further comprising obtaining an image captured by a camera, wherein the talker of the obtained voice is identified based on the image captured by the camera.

9. A talker prediction device comprising:
a voice obtainer that obtains a voice from a plurality of talkers;
a conversation history recorder that records a conversation history of the plurality of talkers;
a talker identifier that identifies a talker of the obtained voice; and a predictor that predicts a next talker among the plurality of talkers based on the identified talker and the conversation history,
wherein the predictor detects a part that the identified talker has talked from the conversation history, and predicts the next talker according to talk probability of a talker talking immediately after the detected part.

10. The talker prediction device according to claim 9, further comprising a camera image controller that performs control of an image captured by a camera based on a result of the prediction.

11. The talker prediction device according to claim 9, further comprising an audio signal processor that performs audio signal processing on an audio signal obtained by a microphone based on a result of the prediction.

12. The talker prediction device according to claim 10, wherein the control of the image includes framing processing.

13. The talker prediction device according to claim 9, wherein the talker identifier identifies the talker of the obtained voice based on a voice feature amount of the obtained voice.

14. The talker prediction device according to claim 9, wherein the talker identifier estimates an arrival direction of a voice, and identifies the talker of the obtained voice based on the arrival direction of the voice.

15. The talker prediction device according to claim 9, further comprising an image obtainer that obtains an image captured by a camera, wherein the talker identifier identifies the talker of the obtained voice based on the image captured by the camera.

16. The talker prediction device according to claim 9, wherein:
the conversation history includes respective conversation histories of a talker on a far-end side and a talker on a near-end side; and
the predictor identifies at least a voice of the talker on the far-end side and predicts a next talker on the near-end side.

17. A talker prediction method comprising:
obtaining a voice from a plurality of talkers;
recording a conversation history of the plurality of talkers;
identifying a talker of the obtained voice; and
predicting a next talker among the plurality of talkers based on the identified talker and the conversation history, wherein:
the conversation history includes respective conversation histories of a talker on a far-end side and a talker on a near-end side, and
at least a voice of the talker on the far-end side is identified to predict a next talker on the near-end side.

* * * * *